(12) United States Patent
Ahuja (10) Patent No.: US 11,435,655 B2
(45) Date of Patent: Sep. 6, 2022

(54) GYRO SENSOR OR VIRTUAL JOYSTICK CONTROLLED SMART HELMET

(71) Applicant: Pulkit Ahuja, New Dehli (IN)

(72) Inventor: Pulkit Ahuja, New Dehli (IN)

( * ) Notice: Subject to any disclaimer, the term of this patent is extended or adjusted under 35 U.S.C. 154(b) by 0 days.

(21) Appl. No.: 17/333,473

(22) Filed: May 28, 2021

(65) Prior Publication Data

US 2022/0066292 A1   Mar. 3, 2022

(51) Int. Cl.
| | |
|---|---|
| *G03B 17/56* | (2021.01) |
| *A42B 3/04* | (2006.01) |
| *H04N 5/232* | (2006.01) |
| *H04N 5/247* | (2006.01) |
| *H04W 4/70* | (2018.01) |

(52) U.S. Cl.
CPC .......... *G03B 17/561* (2013.01); *A42B 3/0406* (2013.01); *H04N 5/23206* (2013.01); *H04N 5/23287* (2013.01); *H04N 5/23299* (2018.08); *H04N 5/247* (2013.01); *H04W 4/70* (2018.02)

(58) Field of Classification Search
CPC ............. G03B 17/561; H04N 5/23299; H04N 5/23206; H04N 5/23287; H04N 5/247; A42B 3/0406; H04W 4/70
See application file for complete search history.

(56) References Cited

U.S. PATENT DOCUMENTS

| | | |
|---|---|---|
| 67,983,952 | 9/2004 | Hartwell et al. |
| 2015/0264229 A1* | 9/2015 | Teetzel ............. H04N 5/225251 348/376 |
| 2017/0221264 A1 | 8/2017 | Perry |
| 2018/0059665 A1* | 3/2018 | Shin ....................... G06K 9/209 |

FOREIGN PATENT DOCUMENTS

| | | |
|---|---|---|
| CN | 106568460 A | 4/2017 |
| CN | 106605996 A | 4/2019 |

* cited by examiner

*Primary Examiner* — Timothy J Henn
*Assistant Examiner* — Fayez A Bhuiyan
(74) *Attorney, Agent, or Firm* — Kenyon Jenckes (57) ABSTRACT

In an embodiment, a gyro sensor or virtual joystick controlled smart helmet may include a motorized and handsfree livestream video stabilization multi-camera system which can be remotely operated over a network. The gyro sensor or virtual joystick controlled smart helmet having a motorized moveable camera, a two way display communication unit via a OLED screen and 360 degree camera combination to enable Augmented Reality, a video and audio transmission system, a reflector for visibility in low light, a rechargeable battery, a carbon fiber plate for protection against battery malfunction, a headphone connection jack, a SIM card slot, a helmet power on/off switch, a power connector, a microgimbal camera module, a Bluetooth and Wi-Fi module, 6 way livestream stabilization using a combination of motors which double up to ensure that the smart helmet can be remotely controlled over a network using a custom application interface.

17 Claims, 10 Drawing Sheets

GYRO SENSOR OR VIRTUAL JOYSTICK CONTROLLED SMART HELMET

CROSS-REFERENCE TO RELATED APPLICATIONS

This application claims priority to Indian Patent Application Serial Number 202011037889, filed Sep. 2, 2020, and entitled "A Novel Gyro Sensor Or Virtual Joystick Controlled Smart Helmet", the entire contents of which are incorporated herein.

TECHNICAL FIELD

This invention relates to a gyro sensor or virtual joystick controlled smart helmet. More particularly, this invention relates to a gyro sensor or virtual joystick controlled smart helmet having a motorized and hands-free livestream video stabilization multi-camera system which can be remotely operated over a network.

BACKGROUND

In the most basic configuration, helmets typically include a rigid shell, often with padding, with straps for affixing the helmet to the helmet wearer. Today use of a helmet is not restricted to protect the head of the user but it can be used for many purposes. Militaries often use high quality helmets with improved protection. More advanced combat helmets include head up displays and are designed for attaching other devices such as cameras and night vision devices. Typically, advanced helmets are also of interest to motorcycle riders and extreme sport enthusiasts, and may include many additional features, such as a visor, mandible protection, audio capabilities and Bluetooth.

Various prior art helmets exist for providing skiers, snowboarders and athletes taking part in sports with information regarding their performance. Many current solutions such as handheld GPS devices, performance measurement units, wristwatches, mobile phones require and other equipment to look at the information.

Many existing electronic performance measurement devices for skiers, snowboarders and other athletes use GPS techniques and require bulky sensor modules mounted at various parts of the user's body. They also include a plurality of sensors attached to the sportsmen that uses wireless communication to the main unit. This makes it inconvenient to use and prone to data errors due to interference and signal reduction. Furthermore, the output displays of current technologies are often very inconvenient to access and lack user-friendly interfaces.

Various smart helmets exist that attempt to protect the helmet wearer from different conditions and provide real time data such as video and audio data of the helmet wearer to another user. Further, smart helmets are available which are used to protect the helmet wearer and provide real time details of the helmet wearer to another person/user but they provide limited function and act on their own. However, despite the aforesaid helmets, a need is felt for more effective, competent, specific, efficient, accurate, detail providing and gyro sensor or virtual joystick controlled smart helmet over any network which auto stabilizes the livestream video in a hands-free and effective manner.

SUMMARY

The present invention relates to a gyro sensor or virtual joystick controlled smart helmet having a motorized moveable camera, a two way display communication unit via a screen, e.g., organic light emitting diode (OLED), and 360 degree camera combination to enable Augmented. Reality (AR), a video and audio transmission system, a reflector for visibility in low light, a rechargeable battery, a carbon fiber plate for protection against battery malfunction, a headphone connection jack, a subscriber identification module (SIM) card slot, a helmet power on/off switch, a power connector, a micro-gimbal camera module, a Bluetooth and Wi-Fi module, 6 way livestream stabilization using a combination of motors which double up to ensure that the smart helmet can be remotely controlled over a network using a custom application interface.

The present invention provides that the gyro sensor or virtual joystick controlled smart helmet system is operated via Microprocessor unit (MPUs) and Microcontroller Units (MCUs) and a circuit mounted on Printed Circuit Boards (PCBs) which provide a wireless seamless experience to the users receiving the camera feed via live broadcast or recorded relay in any part of the world.

The present invention includes a smart helmet which is remotely controlled via virtual joystick or gyro sensors over a network along with a moveable motorized and gimbal stabilized camera and carbon fibre protection. The carbon fibre protection presents a feature for inbuilt battery safeguarding process for a battery operated smart helmet. The moveable motorized multi-camera system can move 360° and the 360° camera system is controlled and auto stabilized by a combination of brushless motors integrated into the smart helmet frame. When the smart helmet is turned on, the motors move to counter any movement of the helmet wearer thereby keeping the livefeed stable and focused. This is further stabilized by an add-on micro gimbal placed across the camera which keeps the camera centred in a singular plane of mounting using electromagnetic fields.

In addition, the present invention also provides the immersive sharing and controlling of video stream by the helmet wearer on one end without the need to hold the camera in their hands or keep adjusting the camera manually every minute in response to the video feed viewer's requirements to adjust the field of view on the receiving end. The video feed is then stabilized using brushless motors which provide counter movement to the multi camera system in respect with the wearer. This countermovement in the triple motor system of the helmet in turn stabilizes the video stream. Furthermore, minute movements in the plane of the camera are stabilized using electromagnetic waves through a micro gimbal mechanism. Thus, any user can remotely control the view from the helmet while the helmet is being worn by the wearer based on the real time information received.

Thus, the smart helmet provides a solution for people who don't want to commute or want to stay in their comfort zone but want to communicate and experience real time activity/detail of any place/material/element.

It is therefore the object of the present invention to provide a gyro sensor or virtual joystick controlled smart helmet having a motorized multi-camera system with a hands-free livestream video stabilization, a two way display communication unit and a 360 degree camera combination to enable Augmented Reality, a video and audio transmission system and it can be remotely controlled over a network. The helmet video feed is triple stabilized using a combination of anti-movement motors which double up as a control mechanism for the live video field of view from a remote user's gyro sensor or virtual joystick.

DETAILED DESCRIPTION

The following description with reference to the accompanying drawings is provided to assist in a comprehensive understanding of exemplary embodiments of the invention in respect of which patent protection is being claimed. It includes various specific details to assist in that understanding but these are to be regarded as merely exemplary. Accordingly, persons skilled in the art will recognize that various changes and modifications to the embodiments described herein can be made without departing from the scope and spirit of the invention. In addition, descriptions of well-known functions and constructions are omitted for clarity and conciseness.

It is to be understood that the singular forms "a," "an," and "the" include plural referents unless the context clearly dictates otherwise.

The present invention relates to a gyro sensor or virtual joystick controlled smart helmet having a motorized moveable camera, a two way display communication unit via a OLED screen and 360 degree camera combination to enable Augmented Reality, a video and audio transmission system, a reflector for visibility in low light, a rechargeable battery, a carbon fibre plate, a headphone connection jack, a SIM card slot, a helmet power on/off switch, a power connector, a camera module connector, a Bluetooth and Wi-Fi module. Further, the smart helmet can be remotely controlled over a network. The smart helmet system is operated via microprocessor unit (MPU) and microcontroller (MCU) and a circuit mounted on Printed Circuit Boards (PCB) which provides a wireless and seamless experience to the users receiving the camera feed via live broadcast or recorded relay in any part of the world.

The gyro sensor or virtual joystick controlled smart helmet has multiple connectivity options and characteristics including: a SIM card option for incorporating the wireless features in remote places without Wi-Fi; Wi-Fi and Bluetooth options which uses visuals coming from the 360 degree rotating motorized camera incorporating PAN, ROLL and TILT movements operated via a combination of motors which couple to provide gimbal anti-movement properties as well; Audio inputs from the inbuilt microphone and audio output from speaker which enables two way audio transmission, i.e., transmission of real time audio communication data from the helmet wearer to the user and transmission of real time audio communication from the user to the helmet wearer; One way real time video data transmission from the helmet wearer to the user; Remote guidance of physical activity of the helmet wearer from the user via audio communication data based on real-time interactive and immersive video feed; 6-axis dual hardware stabilization of video to avoid disturbances due to both major as well as minor movements of the helmet wearer; Night vision enabled camera, controlled and operated remotely via Micro Controller Units and Single Board computer (SBC); Deriving power from an inbuilt rechargeable battery source; A heat insulation coating, carbon fibre plate protection and air cooled ventilation for the wearer's head, and a memory to store the real time and legacy data, The smart helmet is remotely controlled via virtual joystick or gyro sensors over any network providing navigational access to a moveable and dual stabilized motored camera with a carbon fibre protection mechanism. The carbon fibre protection presents a feature for inbuilt battery safeguarding process for a battery operated smart headgear. The moveable motorized multi-camera system can move 360° and the gyro guided 360° camera system is controlled by a group of motors integrated into the smart helmet frame. The motorized camera has an option to be guided via virtual joystick or gyro sensors over a Wi-Fi or Cellular network.

The smart helmet has a modular upper chamber which includes a 360° rotating camera system, a micro controller unit (MCU) and a plurality of motors. The MCU may support various types of wireless modules, e.g., Wi-Fi and Bluetooth modules, and a SIM subscriber identification module) card slot with an internal antenna which supports data transfer between the user and the helmet wearer. The MCU also processes the data and controls motors to counteract the Helmet wearer's movement. The algorithm in the microprocessor unit (MPU) takes control data from server and sends it to MCU which in turn moves the required motor in respective direction. Also, an inbuilt memory is used to store Operating System along with power input and General Purpose Input/output pins.

The motorized moveable camera is attached to Printed Circuit Boards (PCB) as present in the modular and separable upper chamber of the gyro sensor or virtual joystick guided smart helmet. The camera apparatus as attachment is swappable and can be changed to fit any custom requirements which ranges from, but not limited to, providing high definition or providing wider angle or infra-red visibility. The camera apparatus is attached to the Printed Circuit Boards via connectors and can optionally be directly mounted on the Printed Circuit Boards/Single Board Computer. The Printed Circuit Boards/Single Board Computer is also designed to have a modular setup with the ability to interchange the whole camera module as per the requirements.

The moveable motorized camera and the PCB are joined to a combination of motors in three orientations—i.e. vertical, horizontal and side. A horizontally housed motor enables the camera module to PAN across the point of view, i.e. moving left or right; the vertically mounted motor enables a vertical TILT for the camera making it move vertically, i.e. up or down; and the side mounted motor enables a ROLL movement or sideways movement of the camera across the point of view. These motors also compensate for the unintended natural or forced movements by the Helmet wearer.

The gyro sensor or virtual joystick controlled smart helmet also includes a SIM card slot wired to microprocessor unit to enable IoT (Internet of Things) capabilities. This SIM enables independent data transfer with single or multiple paired devices connected using secure video and data transfer protocols. The SIM provides internet access for VOIP and fast data transfer rates. The connection enables live audio and video streaming and control from the invention to any remote application over the internet.

Apart from the integrated SIM module, the gyro sensor or virtual joystick controlled smart helmet can use any other network-forms which include Wi-Fi and Bluetooth modules to connect with the user's mobile phone/tablets/computer/VR device, and other compatible devices.

The network connection enables live video and audio streaming from the smart helmet to the connected mobile devices (e.g., the user's Mobile phones, tablets, computers, smart watches, VR devices, etc.) over the network. The same network also enables remote control of the smart helmet and rotates the motors making the camera move "left/right" or "up/down" as per the signals from the remotely connected user's device. Thus, the smart helmet will work according to the requirement of the user, remotely without any contact. The connection over Wi-Fi will also enable faster pairing and alternative form of communication to a SIM based connection. The same functionality can be achieved over a Bluetooth connection.

The smart helmet has a display panel/unit to provide details including custom user information, user specified content and any relevant product related information like battery charge level, etc. The display unit has the capability to double as a light source if needed by the helmet wearer if riding while wearing the helmet. The smart helmet also has a headphone jack for external devices to connect to the invention seamlessly for audio transmission between the user and the helmet wearer.

In addition, the present invention also provides the immersive sharing and controlling of video stream by the helmet wearer on one end without the need to steadily hold the camera in their hands or keep adjusting the camera manually every minute in response to the video feed viewer's requirements to adjust the field of view on the receiving end. Thus, any user can remotely control the helmet while it is being worn by the helmet wearer based on the real time information received from the helmet wearer.

The power in the gyro sensor or virtual joystick controlled smart helmet is derived from an internal battery and as well using a USB cable. An external charging input to recharge the batteries is present on the rear side of the device. The inbuilt rechargeable battery source is sandwiched between the inside layer of the smart helmet's upper chamber and the inside protective foaming for providing support to the helmet wearer's head. Further, the entire system is activated by a switch reset button) located at the rear end of the swappable section of the smart helmet. A single short press of reset button powers up the smart helmet with a LED indicator indicating that the smart helmet has been 'powered on'. Another short press of the power cum reset button 'turns off' the smart helmet. A long press of the reset button resets the smart helmet and makes it available for pairing with new devices. Thereafter, there is a carbon fibre plate placed between the inbuilt rechargeable battery and protective foam to ensure additional safety to the helmet wearer. The carbon fibre protection presents a feature for inbuilt battery safeguarding and wearer protection process for a smart helmet with or without a swappable helmet shell.

Thus, the gyro sensor or virtual joystick controlled smart helmet provides a solution for people who don't want to commute but still communicate hands-free in a live, interactive and immersive manner or want to stay in their comfort zone but want to experience real time activity/detail of any place/material/element.

Figure 1:
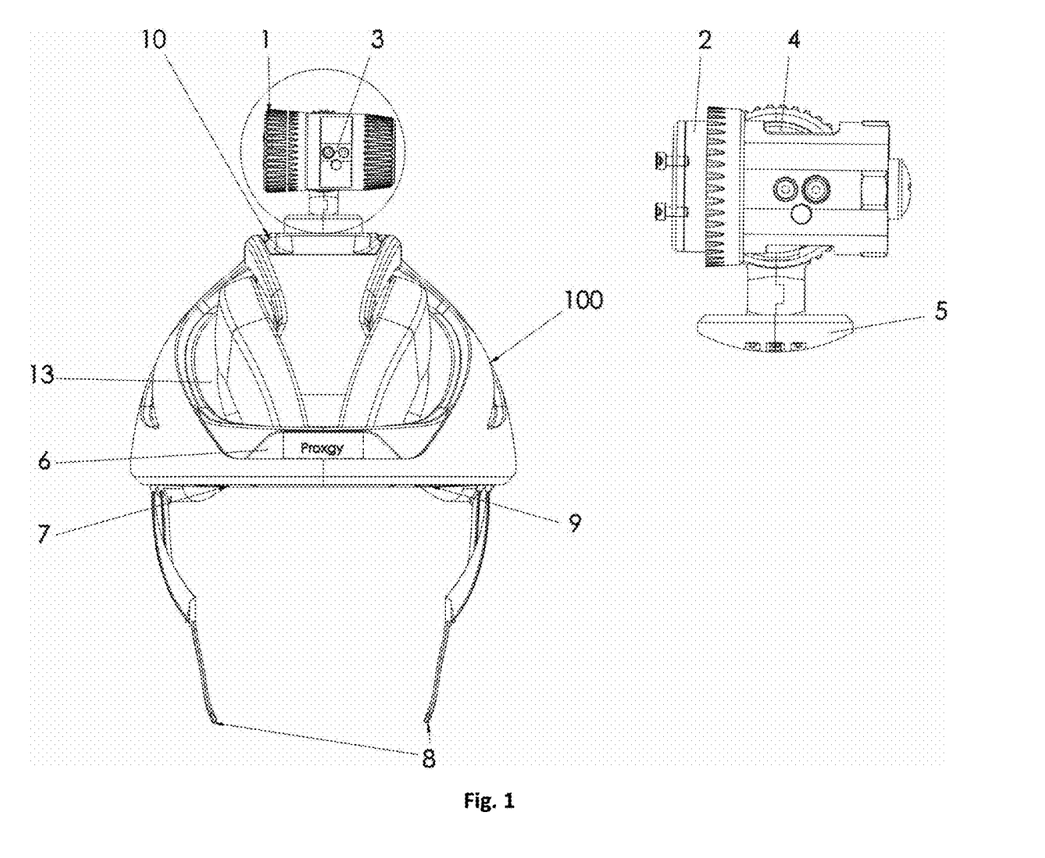
FIG. 1 is a representation of a gyro sensor or virtual joystick controlled smart helmet in accordance with the present invention.

FIG. 1 is a representation of the gyro sensor or virtual joystick controlled smart helmet in accordance to the present invention. The gyro sensor or virtual joystick controlled smart helmet 100 includes two housing components, i.e., upper chamber and lower chamber which are swappable and modular in design. In accordance with one embodiment of the present invention, the upper chamber of the gyro sensor or virtual joystick controlled smart helmet 100 includes a motorized camera mounting 1, motors 2,4 and 5, multi-camera system 3, a display unit 6, microphone (MIC) 7, a pair of tightening straps 8, audio output/speakers 9, a camera module holder 10 and vents for cooling and air circulation 13.

The motorized camera mounting 1 is mounted on top of the helmet which has three motors 2, 4 & 5 in a configuration to give the camera module PAN, TILT and ROLL movement capabilities. The motor 5 of the motorized camera mounting 1 makes the camera move right/left to provide a 360 degree PAN movement. The motor 2 of the motorized camera mounting 1 makes the camera move up/down movement and provides a TILT movement feature. The motor 4 of the motorized camera mounting 1 makes the camera move side to side and provides a ROLL movement capability. The motorized camera mounting 1 is held by a camera module holder 10 to house the multi-camera system 3 on top of the gyro sensor or virtual joystick controlled smart helmet 100.

The multi-camera system 3 mounted on motorized camera mounting 1 is used to collect the data and transfer the real time video data from the helmet wearer to the user who has remote access and control to the motors 2,4 and 5 of the gyro sensor guided smart helmet 100. The video data is transferred from the helmet wearer to the user(s)/viewer(s) over any open network such as WiFi, 3G/4G/5G SIM Network, etc.

The motorized camera mounting 1 houses the multi-camera system 3 along with other apparatus attachments. Further, the gyro sensor or virtual joystick controlled smart helmet is weather proof. The motorized camera mounting 1 is connected to the PCB 17 (FIG. 8) through multiple configurations including internal wirings, Wi-Fi/Bluetooth connectivity or near field communications.

The display unit/panel 6 displays details of the user who is remotely accessing the gyro sensor or virtual joystick controlled smart helmet 100 including name of the user and also shows battery percentage detail. Further, the display unit/panel 6 also includes the helmet state indicator indicating network connection state, network quality indicator, network strength indicator, and helmet operational state on/reboot/reset). The display panel/unit 6 may be an OLED panel which doubles up as a white OLED light source/torch if the helmet wearer is in a ride mode under dark and low lighting conditions.

The MIC 7 is linked to the PCB 17 and is configured below the display unit/panel 6 and is pointed downwards. This unique placement of the MIC 7 decreases the ambient noise of the surrounding and allows the helmet wearer's voice to be transmitted over the network in a focused manner and with minimum error and noise. The MIC 7 gets its power from the attached batteries 19. The batteries 19 may be rechargeable batteries are present on the rear side of the gyro sensor or virtual joystick controlled smart helmet 100. The inbuilt rechargeable battery source is sandwiched between the inside layer of the gyro sensor or virtual joystick controlled smart helmet 100 upper chamber and the internal foaming for providing support to helmet wearer's head.

Further, the power in the gyro sensor or virtual joystick controlled smart helmet 100 is derived from an internal battery 19 and as well using a USB cable. An external charging input to recharge the batteries 19 is present on rear side of the gyro sensor or virtual joystick controlled smart helmet 100. The rechargeable batteries 19 have a heat insulation coating and are air cooled deriving ventilation from the ergonomic design of the gyro sensor or virtual joystick controlled smart helmet 100. These batteries are rechargeable, and the charging discharging cycles are controlled by the onboard SBC (Single Board Computer) which prevents the battery from overheating and getting discharged below the minimum recommended level.

The rechargeable battery 19 is housed in an aerodynamic volume on the rear of the gyro sensor or virtual joystick controlled smart helmet 100 in a chamber like arrangement. This chamber also houses an IC (Integrated Chip) that protects the rechargeable battery 19 from overheating and rapid discharging. The battery housing case also has a carbon fibre layer towards the inside of the gyro sensor or virtual joystick controlled smart helmet 100 under its placement, isolating battery from the helmet wearer's head. There is an external charging option through an input to recharge the batteries 19 when they are discharged. The carbon fibre protection presents a feature for inbuilt battery safeguarding process for a battery operated smart helmet.

The gyro sensor or virtual joystick controlled smart helmet 100 also includes a headphone jack for external devices to connect to the invention seamlessly for audio transmission between the user and the helmet wearer.

The gyro sensor or virtual joystick controlled smart helmet 100 also includes a SIM card slot for placing a SIM in the slot. The SIM card slot is wired to the Micro Controller Units to enable IoT (Internet of Things) capabilities. This SIM enables independent data transfer with single or multiple paired devices connected using secure video and data transfer protocols. The SIM provides internet access for VOIP and fast data transfer rates. The connection enables live audio and video streaming from the invention to any remote application over the internet.

Apart from the integrated SIM module, the gyro sensor or virtual joystick controlled smart helmet 100 can use any other network form including Wi-Fi and Bluetooth modules to connect with the user's mobile phone/tablets/computer VR devices, and other compatible devices. The network connection enables live streaming from the gyro sensor or virtual joystick controlled smart helmet 100 to the connected mobile devices (user's Mobile phones, tablets, computers etc.) over the network. The same network also enables remotely control of the gyro sensor or virtual joystick controlled smart helmet 100 and move the servo motors making the camera move "left/right" or "up/down" as per the signals from the remotely connected user's device. Thus, the gyro sensor or virtual joystick controlled smart helmet 100 will work according to requirement of the user without any contact. The connections over Wi-Fi will also enable faster pairing and alternative form of communication to a SIM based connection. The same functionality can be achieved over a Bluetooth connection.

The gyro sensor or virtual joystick controlled smart helmet 100 is powered by an On/Off switch located at the rear end of the gyro sensor or virtual joystick controlled smart helmet 100. A single short press of reset button powers up the gyro sensor or virtual joystick controlled smart helmet 100 with an LED indicator indicating that the gyro sensor or virtual joystick controlled smart helmet 100 has been 'powered on'. Another short press of the power cum reset button 'turns off' the gyro sensor or virtual joystick controlled smart helmet 100. A long press of the reset button resets the gyro sensor or virtual joystick controlled smart helmet 100 and makes it available for pairing with new devices.

The rechargeable battery 19, power connector and camera module connector are connected to the the Printed circuit board 17. Finally, the gyro sensor or virtual joystick controlled smart helmet 100 can be adjusted by the helmet wearer using ear strap/hook 8 for holding the helmet in place.

Figure 2:
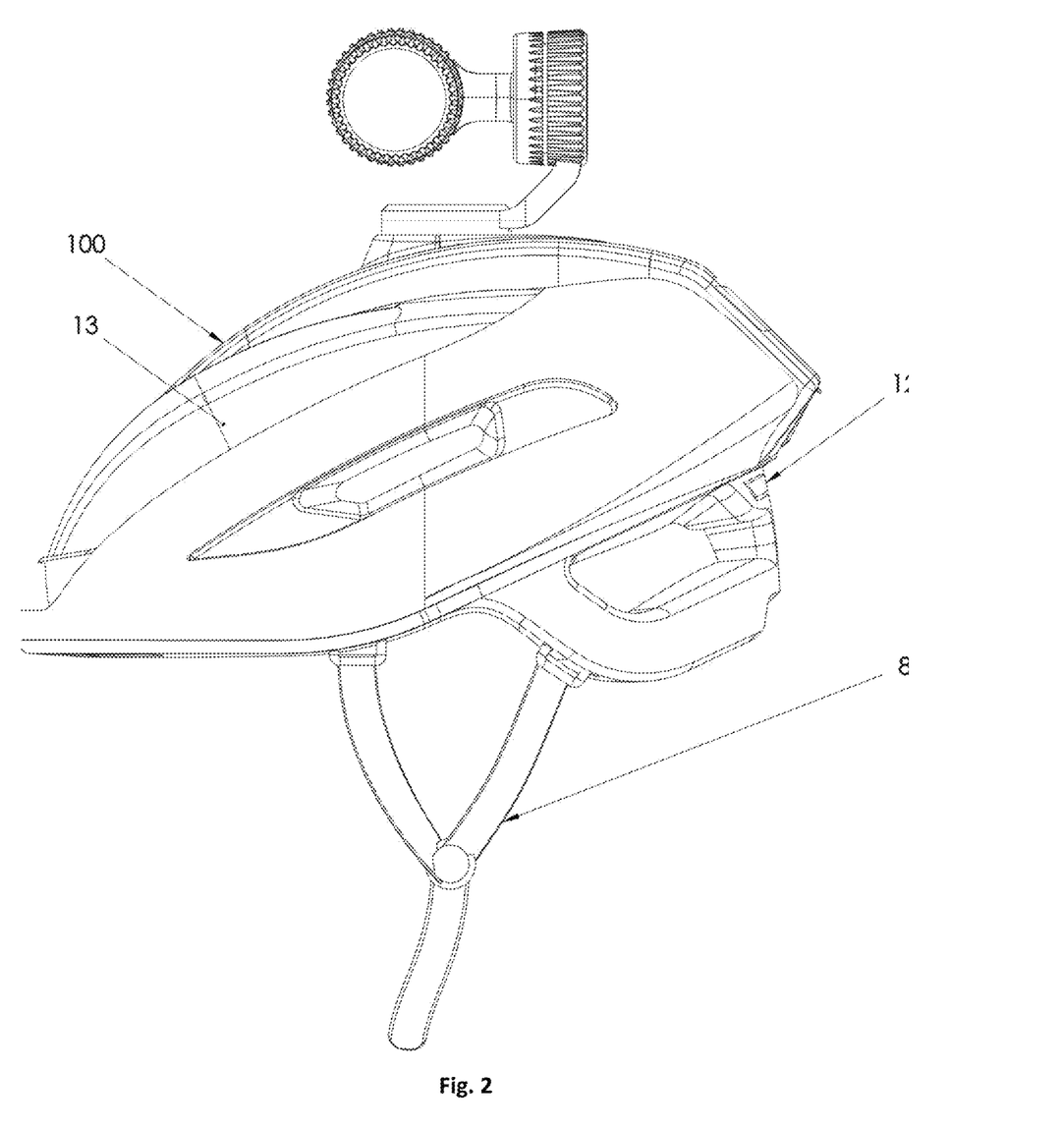
FIG. 2. is another representation of the gyro sensor or virtual joystick controlled smart helmet in accordance with the present invention.

FIG. 2 is another representation of the gyro sensor or virtual joystick controlled smart helmet in accordance with the present invention. The upper chamber of the gyro sensor or virtual joystick controlled smart helmet 100 is designed in such a way that the aerodynamic vents 13 keep the wearer's head cool and ventilated. There is a high tensile strength strap 8 with a lock mechanism to keep the helmet mounted and in place while protecting the wearer.

Further, a reflector 12 is present on the device for rear indication and presence establishment in low light conditions. So, the reflector 12 adds a safety feature for the helmet wearer in dark environments.

Figure 3:
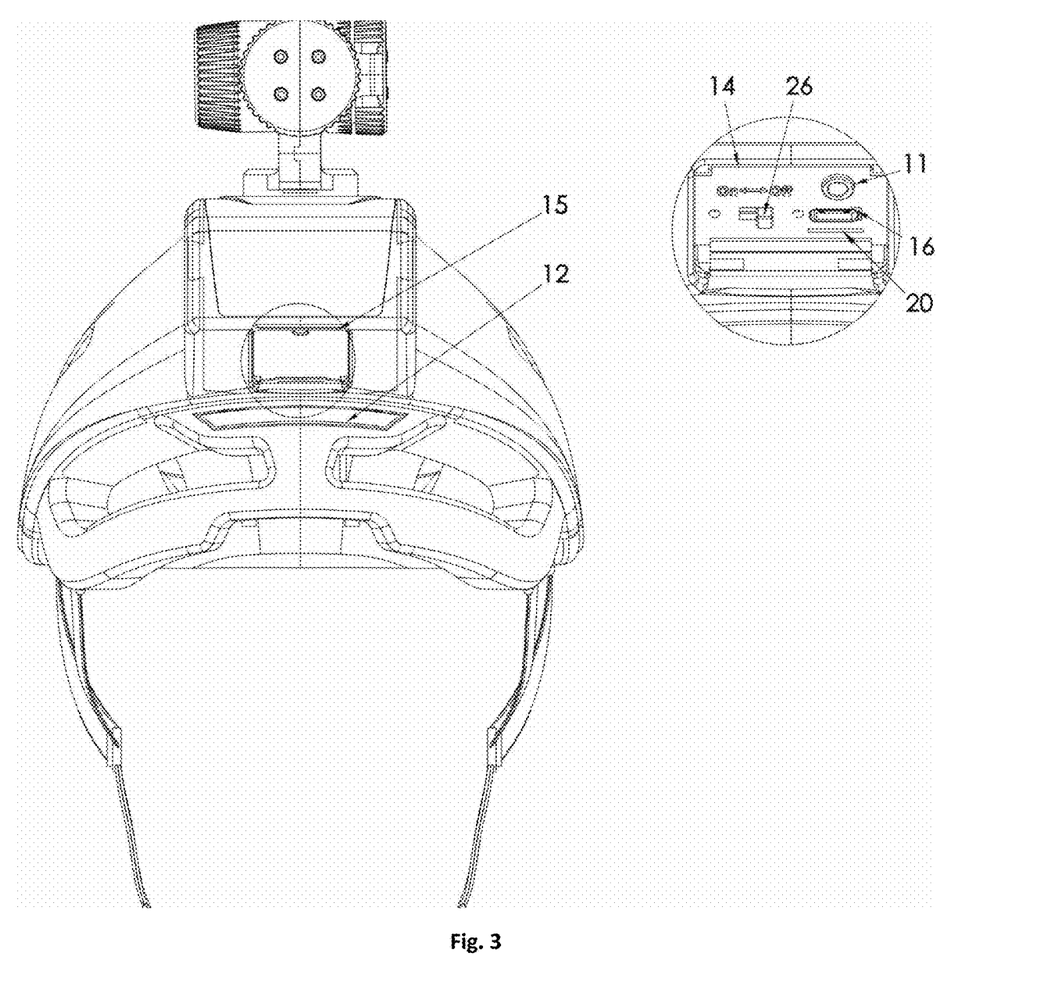
FIG. 3 is a back view of the gyro sensor or virtual joystick controlled smart helmet in accordance with the present invention.

FIG. 3 refers to the back profile of the helmet. The battery 19 and PCB 17 enclosures are made weatherproof with a solid covering and the back also features a safety reflector 12 to make the other travelers aware of the helmet wearer's presence even in dark environments. There's also space for branding on the waterproof covering.

On the rear side of the helmet 100, an input wedge 14 is present which is covered in default position with a weatherproof clutch 15 which opens to reveal the charging port 16, audio jack 11 and the SIM card slot 20. The input wedge 14 also houses the on/off cum reset switch 26 and the reflector 12 acts as a LED indicator to convey the state of the gyro sensor or virtual joystick controlled smart helmet 100 on the press of the on/off switch 26.

Further, on rear side of the gyro sensor or virtual joystick controlled smart helmet 100 a USB charging port, a 3.5 mm audio jack and a SIM card slot are present. Also the Print Circuit Board is arranged with a set of rechargeable batteries 19 with fast charge capabilities. The battery 19 and PCB 17 arrangement is placed over a carbon fibre sheet which protects the user and provides an added security feature to the smart helmet 100.

Figure 4:
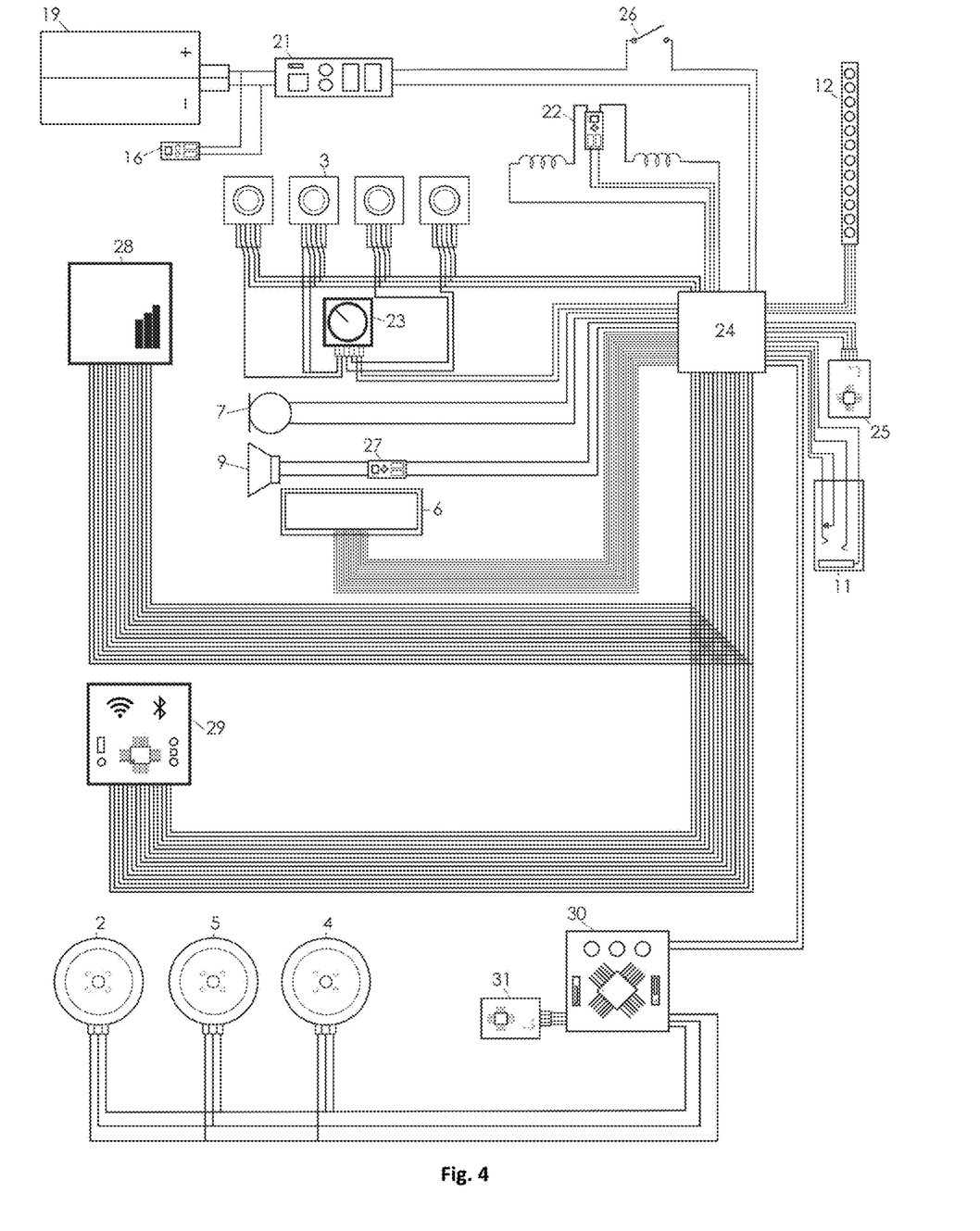
FIG. 4 is a schematic circuit diagram for the gyro sensor or virtual joystick controlled smart helmet in accordance with the present invention.

FIG. 4 is a Schematic circuit diagram for the gyro sensor or virtual joystick controlled smart helmet in accordance with the present invention. Referring to FIG. 4, this figure shows the a network between all the major components which are present in the invention along with the connection setup of electrical circuit—the rear unit, audio jack 11, charging port 16, rechargeable batteries 19, reflector 12, reset/on-off switch 26, MIC 7, speaker 9, display unit 6, motors 2,4 and 5 and multi-camera system 3 to the central PCB 17.

The central PCB 17 has a microprocessor 24 which is the main processing unit of the gyro sensor or virtual joystick controlled smart helmet 100. The central PCB 17 is powered by a rechargeable battery unit 19 by converting the voltage to appropriate level using a voltage converter 21. The microprocessor 24 through the camera module has wires reaching out from the timer 23 to the multi-camera system 3. The cameras 3 provides multiple quality option video feeds to the microprocessor 24 which relays the feed to the onboard Wi-Fi+Bluetooth connectivity module 29 or Sim Module 28. The PCB 17 has ports for connecting motors 2, 4 and 5 wired to the microprocessor 24 which enables rotation of the camera mounting 1 across 3 axes.

The image stabilization is achieved with the combination of IMUs, i.e. Inertial Motion Units 25&31, Micro Gimbal controller 22 and motor controller 30. The input for these motors comes via the microprocessor from the remote user's application connected over the internet through the microprocessor's 24, Bluetooth/Wi-Fi module 29 or SIM module 28. The PCB 17 also connects to a MIC 7 for audio input between the helmet wearer and the user. To enable audio output for the helmet wearer, a speaker 9 with an amplifier 27 is connected to the microprocessor 24. The PCB 17 also connects to a MIC 7 for audio input between the helmet wearer and the user.

The input wedge 14 houses an Audio Jack 11, a SIM card slot and a charging port 16. The jack gives an additional connectivity option for audio connectivity and USB cable slot provides charging options for the rechargeable batteries 19. The SIM card housed in the SIM card module 28 gives an independent wireless connectivity option to the gyro sensor or virtual joystick controlled smart helmet 100 for it to connect to the internet. This connection is present in addition to the Wi-Fi and Bluetooth connectivity options with a paired device.

Powering on and powering down of the invention is done via an on/off button 26 which doubles up as a reset button on a long press action.

Also PCB 17 is arranged with a set of rechargeable batteries 19 with fast charge capabilities. The battery 19 and PCB 17 arrangement is placed over a carbon fibre sheet 18 which protects the user and provides an added security feature to the smart helmet 100.

The rechargeable batteries 19 have a heat insulation coating and are air cooled deriving ventilation from the ergonomic design of the air vents 13 on the surface of the helmet. These batteries are rechargeable, and the charging discharging cycles are controlled by the onboard MPU 24 which prevents the battery 19 from overheating and getting discharged below the minimum recommended level.

The rechargeable battery 19 is housed in a modular and swappable aerodynamic volume on the rear end of the helmet 100 in a chamber like arrangement. This swappable chamber also houses an IC that protects the rechargeable battery 19 from overheating and rapid discharging. The battery housing case also has a carbon fibre plate 18 towards the inside of the helmet 100 under its placement, forming a protective layer between the battery 19 and the helmet wearer's head. There is an external charging port 16 to recharge the batteries 19 when they are discharged. The carbon fibre protection presents a feature for inbuilt battery safeguarding process for a battery operated smart helmet.

The smart helmet 100 also includes a SIM card slot 20 for activating a 3G/4G/5G connection. The SIM card slot 20 is wired to the microprocessor unit 24 to enable IoT capabilities. This SIM enables independent data transfer with single or multiple paired devices connected with the helmet from anywhere in the World.

The rechargeable battery 19, power connector and camera module connector are connected to the Printed circuit board 17. Finally, the smart helmet 100 can be adjusted by the helmet wearer using ear strap/hook 8 for holding the helmet in place.

Figure 5:
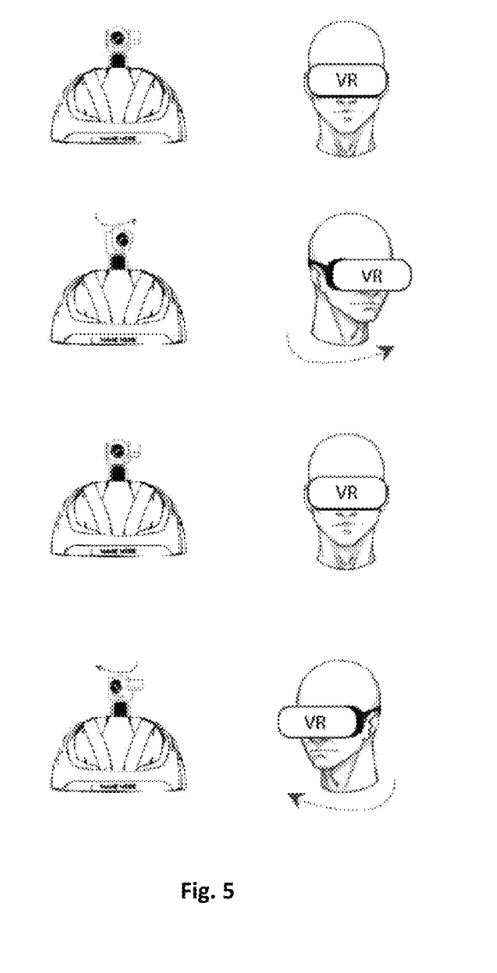
FIG. 5 is a diagram showing workings of hands-free gyro control of the smart helmet over any network.

FIG. 5 shows the workings of VR control of the gyro sensor or virtual joystick controlled smart helmet over any network. It illustrates how the smart helmet 100 will be controlled by users head movements in a touch free manner to enable virtual reality feed being transmitted live to the user while the user is able to control the view, camera positions and functions on the smart helmet without even using his/her hands. For working of the smart helmet 100, the user has an option of connecting and controlling the smart helmet 100 with a device over a VR headset in 3D mode. Through the remote application, the user's VR headset will have a direct connection over the internet to camera mounting 1 of the gyro sensor or virtual joystick controlled smart helmet 100. This connection enables the camera mounting 1 and the multi-camera system 3 to respond real time with adjusting the point of view of the live feed whenever there is a signal from the user's application based on the user's head movement in any of the 6 axis. The user application has multiple sensor monitoring services gyro-sensor, rotational sensor, directional sensor which detect a movement in any direction. These sensors give the signal of the movement of the head to the camera mounting 1 which responds to the signal by moving the multi-camera system 3 in the same direction and with the same intensity as the user's head, through the motors 2, 4 and 5 attached to the camera mounting 1.

Therefore, the connected control system, which is the user application being used on a mobile phone or a VR headset in this case, acts as a remote control to the motors 2, 4 and 5. The movement from the user's device will be picked up by a combination of gyro sensors, rotational sensors and directional sensors and the motors on the gyro sensor or virtual joystick controlled smart helmet 100 will act accordingly towards TILT, PAN and ROLL movements changing the field of view according to the remote user's head movements. Thus, the helmet wearer will function as physical proxy standing in lieu of the remote user in the physical world while the smart helmet 100 operates and transmits real time as per the instructions received from the remote user based on his/her head movements over a network. The user is thus virtually teleported to his/her physical proxy's location and environment while staying at a remote location and experiencing what the physical proxy is experiencing in an interactive and immersive 3D environment and control.

So, for example—when the VR device/user's head will move right, the camera module 1 and multi-camera system 3 of the gyro sensor or virtual joystick controlled smart helmet 100 will move right, when the VR device/user's head will move left, the camera module 1 and multi-camera system 3 of the gyro sensor or virtual joystick controlled smart helmet 100 will move left, when the VR device/user's head will move up, the camera module 1 and multi-camera system 3 of the gyro sensor or virtual joystick controlled smart helmet 100 will move up and when the VR device/user's head will move down, the camera module 1 and multi-camera system 3 of the gyro sensor or virtual joystick controlled smart helmet 100 will move down and so on. The movements are directional and of equal intensity which is ensured by using the quaternion system with a deadband of two degrees which is configurable and adjustable from the central control servers. This deadband provides for better user experience as it counters and neglects any minute user movements which might be due to a shaky hand while operating the gyro sensor device remotely or involuntary muscle twitch.

Figure 6:
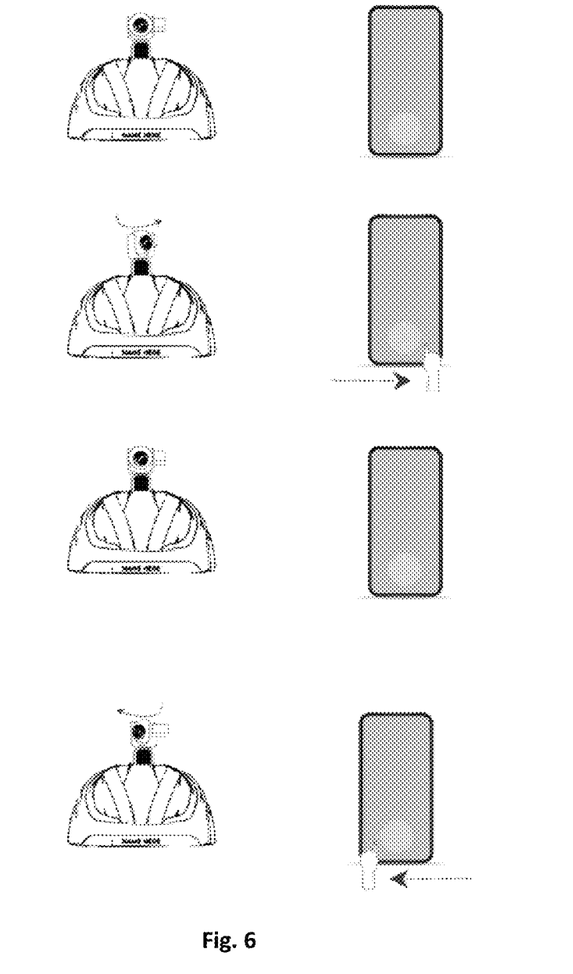
FIG. 6 is a diagram showing workings of software joystick control of the smart helmet over any network.

FIG. 6 shows the workings of application joystick control of the gyro sensor or virtual joystick controlled smart helmet 100 over the network. The figure illustrates how the gyro sensor or virtual joystick controlled smart helmet 100 will be controlled by a virtual joystick over any network.

The remote application will be connected to the gyro sensor or virtual joystick controlled smart helmet 100 over the internet. The application will have virtual directional buttons overlaying on the transmission screen displaying the real time view from the multi-camera system 3 of the smart helmet 100, which, for the purpose of easy reference are called joystick buttons. The user has the option of controlling the gyro sensor or virtual joystick controlled smart helmet's camera module 1 and can move it from joystick on his mobile phone.

If the user presses a button for e.g. Left or Right or Up or Down on his mobile, the gyro sensor or virtual joystick controlled smart helmet's camera module 1 and multi-camera systems, which are connected to the application software over the internet via the PCB 17, responds by moving the same way for e.g. Left or Right or Up or Down and by equal intensity using the quaternion system. The connected mobile device's joystick, therefore, acts as a remote control to the smart helmet's multi-camera system 3 through the connected motors 2, 4 and 5. The movement of smart helmet camera module 1 will act accordingly towards TILT, PAN and ROLL as per the directions from this user's joystick.

Thus, the gyro sensor or virtual joystick controlled smart helmet 100 can be remotely controlled by using a gyro control as well as by joystick using the user's head movements or his/her mobile phone over any network. Further, the user can guide the helmet wearer through audio to get the video data based on the remote physical view navigation. The virtually connected smart helmet 100 has a two way audio connection, so the audio data will be transmitted from the helmet wearer to the user and from the user to the helmet wearer. Therefore, the user will get the real time information—video and audio data from the helmet wearer which the user can control via a concoction of gyro, directional and rotational sensors or via a virtual joystick.

Therefore, there is immersive sharing and controlling of multi-camera system video stream by the helmet wearer on one end without the need to hold the camera in their hands or keep adjusting the camera manually every few seconds in response to the video feed viewer's requirements to adjust the field of view on the receiving end. Thus, any user can remotely control the helmet while it is being worn by the helmet wearer based on the real time information received from the helmet wearer.

As a result, the gyro sensor or virtual joystick controlled smart helmet 100 provides a solution for people who don't want to move or want to stay in their comfort zone but want to experience real time activity/detail of any place/material/element as if they were physically there through a human proxy wearing a smart helmet providing a kind of virtual teleportation experience to the end user.

Figure 8:
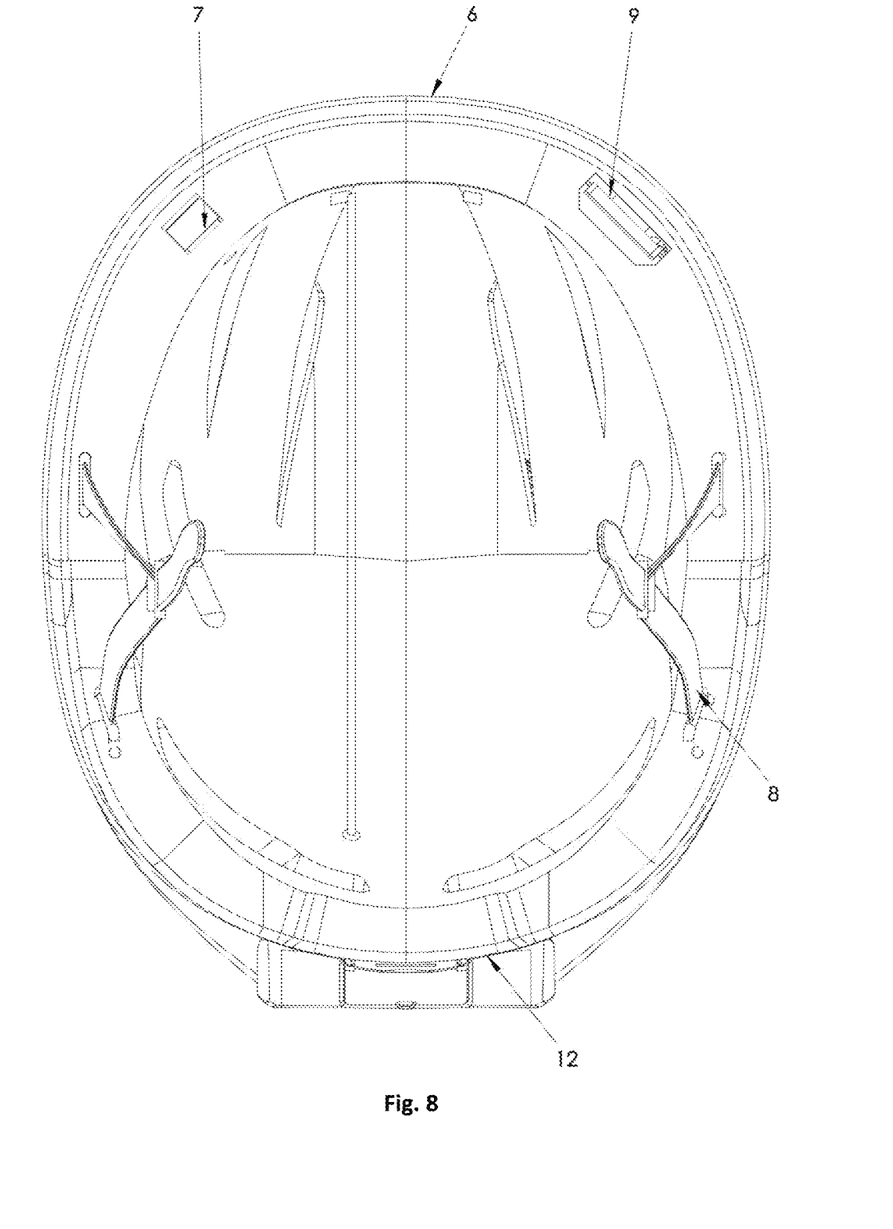
FIG. 8 is a bottom view of the gyro sensor or virtual joystick controlled smart helmet in accordance with the present invention.

FIG. 8 illustrates the bottom profile of the gyro sensor or virtual joystick controlled smart helmet 100. The Helmet module encloses MIC 7, speaker 9 and reflector 12 along with the front display unit 6. The high tensile strength straps 8 are fixed to the gyro sensor or virtual joystick controlled smart helmet 100 with an adjustable lock mechanism to keep the helmet mounted and in place while protecting the wearer.

The MIC is connected to the PCB 17 and is positioned underneath the display unit/panel 6, pointing downwards as shown in the diagram. This unique placement of the MIC 7 decreases the ambient noise of the surrounding and allows the helmet wearer's voice to be transmitted over the network in a focused manner and with minimum error and noise. The MIC 7 gets its power from the attached batteries 19. The Audio output can be taken to two sources, one to the speaker 9 and other via headphones using the Audio Jack 11.

Figure 9:
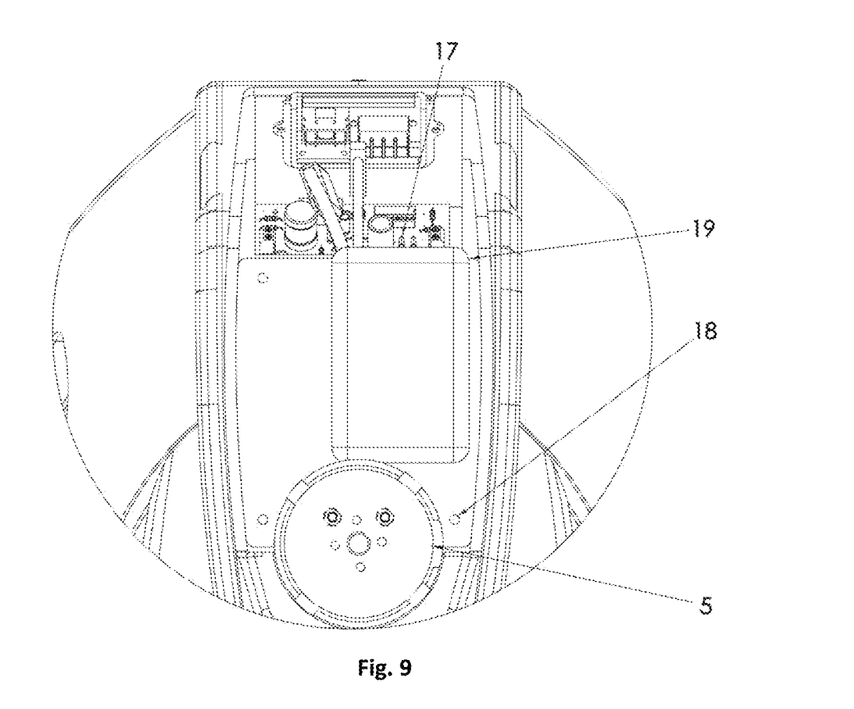
FIG. 9 is a bottom view of the gyro sensor or virtual joystick controlled smart helmet in accordance with the present invention

FIG. 9 illustrates the top profile of the gyro sensor or virtual joystick controlled smart helmet 100. It illustrates that the battery 19 along with the carbon fiber plate 18 provides protection for the smart helmet wearer's head from any possible malfunction. The PCB 17 is also housed on the back side of the helmet. The top view of X-axis motor 5 is also visible from this view.

Figure 10:
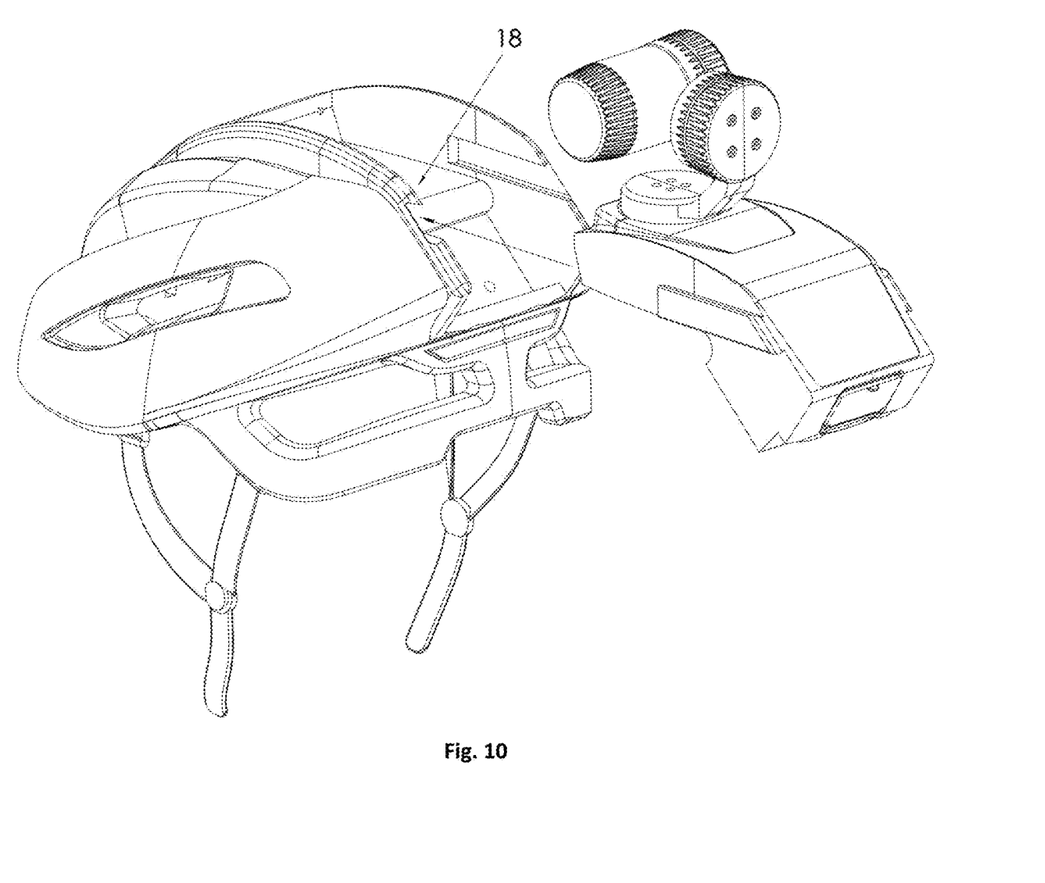
FIG. 10 is a back view detailing the modular structure used to convert any helmet into a smart helmet.

FIG. 10 illustrates the swappable IoT mechanism on the rear of the smart helmet 100 along with the carbon fibre protection 18 for the helmet wearers head. This swappable IoT mechanism is useful for transforming any no smart helmet into a smart helmet enabling it to become a gyro sensor or virtual joystick controlled smart helmet 100. The smart helmet 100 is able to be remotely controlled via virtual joystick or gyro sensors over a network using IoT mechanism.

Figure 7:
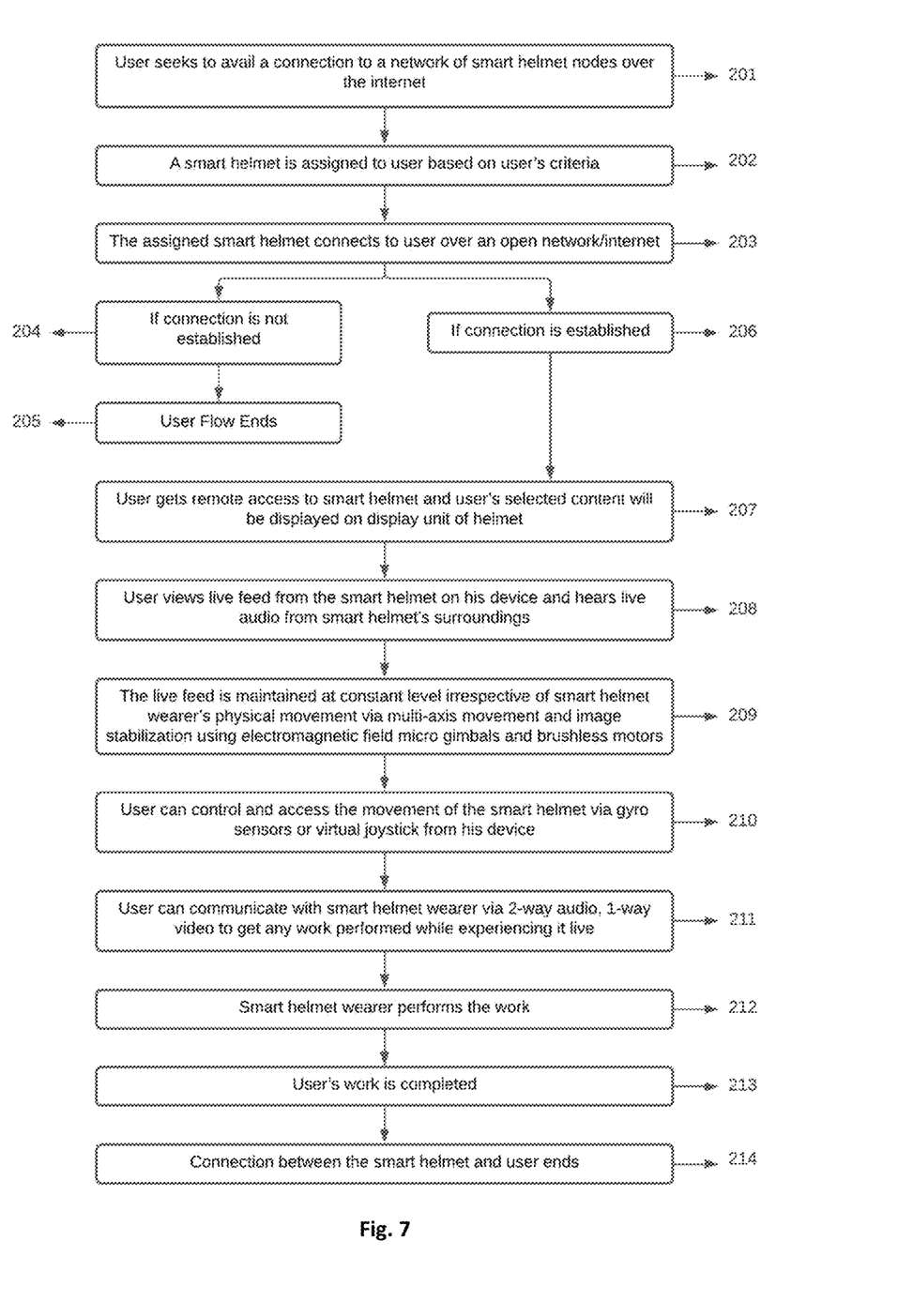
FIG. 7 is a flowchart to illustrate the working of the gyro sensor or virtual joystick controlled smart helmet.

FIG. 7 is a flowchart to illustrate the working of the gyro sensor or virtual joystick controlled smart helmet 100. At step 201, a user seeks to avail a connection to a network of smart helmet nodes over a network. At step 202, user sends a request for service to a gyro sensor or virtual joystick controlled smart helmet 100 and at step 203, any smart helmet wearer can respond to the request for received in step 202 by assigning control to the user via a central server based on the user's criteria.

In one instance and at step 204, if the connection is not established or the connection request is denied due to any issue at either the user end or helmet wearer end, then the user flow will end at step 205.

However, in the other instance and at step 206, if that connection request is granted/accepted, then the end user requesting access gets remote access to the gyro sensor or virtual joystick controlled smart helmet 100 and the user's detail/content will be displayed on the display unit 6, at step 207.

As a result, at step 208, the user will view real time or live video feed on his device from the gyro sensor or virtual joystick controlled smart helmet 100 and also gets audio data and can hear/talk real time with live two way audio connectivity from the smart helmet's surrounding.

Then at step 209, the user will get the complete remote control over the camera module 1 movement and will communicate with the helmet wearer using two-way audio communication system. The movement is controlled via the 3 motor system 2, 4 and 5 and the multi-camera video feed is stabilized via a combination of: Electronic Image Stabilization; Micro gimbal using electromagnetic fields; and 6 axis macro gimbal.

In one case and at step 210, the user can access and control movement of the smart helmet via gyro-sensors or virtual joystick from his mobile/computer/tablet/VR device. Further, in other case, the user can also access the gyro sensor or virtual joystick controlled smart helmet 100 using a software joystick on his mobile device.

Further, at step 211, the user can use the smart helmet wearer for his desired work using 2 way audio and 1 way video, and at step 212, smart helmet wearer will perform the desired work of the user. Then at step 213, the smart helmet wearer will complete the work of the user as per the instruction received from the audio communication. Finally, at step 214, after completion of the work, either the smart helmet wearer or user will end the session and two-way connection will be stopped. As a result, the virtually connected smart helmet 100 is ready to perform another work based on another connection and communication.

Accordingly, the gyro sensor or virtual joystick controlled smart helmet 100 will perform movement based on the input from the end user as per the user's head movements, hand movement or joystick control. Thus, the gyro sensor or virtual joystick controlled smart helmet 100 will perform the real time activity and transmit the real time data video and audio data to the user who has the remote access over any network. As a result, the gyro sensor or virtual joystick controlled smart helmet 100 provides a solution for people who don't want to move or want to stay in their comfort zone but want to experience real time activity/detail of any place/material/element in an immersive and engaging manner.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash memory, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

In conclusion, an improved solution is provided for people who don't want to move or want to stay in their comfort zone but want to experience real time activity/detail of any place/material/element. While detailed descriptions of one or more embodiments of the invention have been given above, various alternatives, modifications will be known to the person skilled in the art. Thus, the above description should not be taken as limiting the scope of the invention.

The invention claimed is:

1. A remote controllable smart helmet comprises:
   a helmet body including a cavity in a rear portion of the helmet body configured to receive a swappable camera assembly;
   a camera module comprising:
      a motorized camera mounting;
      a multi-camera system configured to rotate 360 degrees mounted to the motorized camera mounting; and
      a plurality of motors configured to provide auto image stabilization and control field of view for the multi-camera system, the plurality of motors configured to give the camera module movement capabilities across multiple axes;
      a two way communication unit configured to wirelessly transmit video, audio, and control information between the smart helmet and a remote user device; and
      a controller operative to communicate control information from a remote user device to the plurality of motors; and
   the swappable camera assembly comprising:
      the camera module,
      the two-way communication unit,
      the controller, and
   wherein with the swappable camera assembly mounted in the cavity, the camera module is disposed on a top of the helmet body.

2. The remote controllable smart helmet of claim 1, wherein a plurality of motors comprises three motors configured to give the camera module PAN, TILT and ROLL movement capabilities.

3. The remote controllable smart helmet of claim 2, wherein a plurality of the motors are configured to perform hardware image stabilization across a 6 axis interface.

4. The remote controllable smart helmet of claim 3, wherein the camera module further comprises:
   a plurality of inertial motion units; and a plurality of micro-gimbals, wherein the inertial motion units and micro-gimbals are connected to the plurality of motors to assist in performing the hardware image stabilization.

5. The remote controllable smart helmet of claim 1, wherein the control information includes control commands received from a combination of remotely operated gyro, directional and rotational sensors.

6. The remote controllable smart helmet of claim 1, wherein the multi-camera system is configured to provide augmented reality imaging.

7. The remote controllable smart helmet of claim 1, wherein the multi-camera system is configured to enable livestream transmission of 3D videos and in-video physical view navigation.

8. The remote controllable smart helmet of claim 1, further comprising a rechargeable battery connected to the camera module, two-way communication unit, and controller.

9. The remote controllable smart helmet of claim 1, wherein the two-way communication unit is configured to transmit video data from the camera module over at least one of a WiFi network and 3G/4G/5G SIM network.

10. The remote controllable smart helmet of claim 8, further comprising a carbon fibre plate positioned between the rechargeable battery and an interior of the helmet body.

11. A method for interacting with a remote controllable smart helmet for an immersive experience, the smart helmet including a rear portion of the helmet body configured to receive a swappable camera assembly including a motorized camera mounting including a motorized camera module, a two-way communication unit, and a controller, the method comprising:

mounting the swappable camera assembly in the rear portion of the helmet body;

receiving livestream video information from the motorized camera mounting in the swappable modular system mounted on the remote controllable smart helmet via the two-way communication unit, wherein the motorized camera module is in a first position for a first view;

transmitting control information indicative of moving the motorized camera module to a second position for a second view over multiple axes to the controller in the swappable camera assembly via the two-way communication unit, wherein the motorized camera module is able to rotate 360 degrees; and receiving livestream video information from the motorized camera module in the second position via the two-way communication unit.

12. The method of claim 11, wherein transmitting the control information comprises information operative to control the motorized camera system through one or more of PAN, TILT and ROLL movements.

13. The method of claim 11, wherein the livestream video information is hardware image stabilized at the smart helmet.

14. The method of claim 11, wherein the control information is generated by gyro, directional and rotational sensors.

15. The method of claim 11, wherein the control information is generated by a virtual joystick.

16. The method of claim 11, further comprising receiving audio information generated from a microphone in the smart helmet.

17. The method of claim 11, further comprising transmitting voice information to a wearer of the smart helmet.

* * * * *